US008477836B2

(12) United States Patent
Yoon et al.

(10) Patent No.: US 8,477,836 B2
(45) Date of Patent: Jul. 2, 2013

(54) SYSTEM AND METHOD FOR COMPARING AN INPUT DIGITAL VIDEO TO DIGITAL VIDEOS USING EXTRACTED AND CANDIDATE VIDEO FEATURES

(75) Inventors: Young-Suk Yoon, Daejeon (KR); Wonyoung Yoo, Daejeon (KR); Yong-Seok Seo, Daejeon (KR); Sang Kwang Lee, Daejeon (KR); Jin Soo Seo, Daejeon (KR); Seungjae Lee, Daejeon (KR); Weon Geun Oh, Daejeon (KR); Young Ho Suh, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 358 days.

(21) Appl. No.: 12/665,311

(22) PCT Filed: Jun. 18, 2008

(86) PCT No.: PCT/KR2008/003443
§ 371 (c)(1),
(2), (4) Date: Dec. 17, 2009

(87) PCT Pub. No.: WO2008/156296
PCT Pub. Date: Dec. 24, 2008

(65) Prior Publication Data
US 2010/0182401 A1    Jul. 22, 2010

(30) Foreign Application Priority Data

Jun. 18, 2007 (KR) .................. 10-2007-0059356
Dec. 12, 2007 (KR) .................. 10-2007-0129389

(51) Int. Cl.
*H04N 11/02* (2006.01)

(52) U.S. Cl.
USPC ............................................ 375/240.01

(58) Field of Classification Search
USPC ............................................ 375/240.24
See application file for complete search history.

(56) References Cited

U.S. PATENT DOCUMENTS

| | | | | |
|---|---|---|---|---|
| 5,828,785 | A * | 10/1998 | Kitsuki ................... | 382/232 |
| 6,047,085 | A * | 4/2000 | Sato et al. ................... | 382/165 |
| 6,393,054 | B1 * | 5/2002 | Altunbasak et al. .......... | 375/240 |
| 6,411,339 | B1 * | 6/2002 | Akutsu et al. ................ | 348/584 |
| 7,272,183 | B2 * | 9/2007 | Abiko et al. ............. | 375/240.16 |

(Continued)

FOREIGN PATENT DOCUMENTS

| EP | 1 244 025 | 5/2007 |
|---|---|---|
| JP | 10-320400 | 12/1998 |

(Continued)

OTHER PUBLICATIONS

"On the Use of Computable Features for Film Classification", Zeeshan Rasheed et al., IEEE Transactions on Circuits and Systems for Video Techonology, vol. 15, No. 1, Jan. 2005.

*Primary Examiner* — David Czekaj
*Assistant Examiner* — Leron Beck
(74) *Attorney, Agent, or Firm* — Blakely Sokoloff Taylor & Zafman (57) ABSTRACT

A method for managing digital videos includes extracting a feature of an input digital video, searching for candidate features having similarity to the extracted feature, and comparing the extracted feature with each of the candidate features to select at least one of the candidate features similar to the extracted feature and provide information on a digital video corresponding to the selected candidate feature.

15 Claims, 4 Drawing Sheets

U.S. PATENT DOCUMENTS

| | | | |
|---|---|---|---|
| 7,379,627 B2 * | 5/2008 | Li et al. | 382/305 |
| 7,515,714 B2 * | 4/2009 | Orihashi et al. | 380/255 |
| 7,853,084 B2 * | 12/2010 | Shiraishi et al. | 382/192 |
| 2005/0069291 A1 | 3/2005 | Voss et al. | |
| 2005/0084236 A1 * | 4/2005 | Itoh | 386/46 |
| 2006/0251328 A1 * | 11/2006 | Boo | 382/220 |

FOREIGN PATENT DOCUMENTS

| | | |
|---|---|---|
| KR | 10-2002-0060981 | 7/2002 |
| KR | 10-2005-0030590 | 3/2005 |
| KR | 10-0687732 | 2/2007 |

* cited by examiner

SYSTEM AND METHOD FOR COMPARING AN INPUT DIGITAL VIDEO TO DIGITAL VIDEOS USING EXTRACTED AND CANDIDATE VIDEO FEATURES

CROSS-REFERENCE(S) TO RELATED APPLICATIONS

The present invention claims priority of Korean Patent Applications No. 10-2007-0059356, filed on Jun. 18, 2007, and No. 10-2007-0129389, filed on Dec. 12, 2007, which are incorporated herein by reference.

The present patent is a non-provisional claiming the benefit of Application No. PCT/KR2008/003443, filed Jun. 18, 2008.

TECHNICAL FIELD

The present invention relates to a digital video managing system associated with features, DNA (deoxyribonucleic acid) or digital finger printing as one way of digital content management and protection, and more particularly, to a system and method for efficiently managing large capacity digital videos, which involve recognizing specific video information or searching for identical digital videos, and monitoring and tracing digital videos being broadcasted and distributed illegally.

This work was supported by the IT R&D program of MIC/IITA [2007-S-017-01, Development of user-centric contents protection and distribution technology].

BACKGROUND ART

Recently, rapid technical advances in network have made it possible for anyone to easily produce, process, and distribute a variety of multimedia contents over Internet, etc. Also, with rapid advances in media acquisition and processing techniques, such things as media production with a small camcorder and other equipments, media creation using various application programs, media processing based on other media already produced, and media distribution through P2P (peer-to-peer), Internet portal site, diverse sharing programs, UCC (user creative contents), etc. became part of every day life for many people.

Therefore, in multimedia services, there is a need for a digital video management system capable of managing digital videos more efficiently, which involves such techniques as identifying source and information of encoded digital media that past techniques could not identify the source and information, searching for identical digital videos yet having different analog signals due to exposure to diverse noises, and tracing or monitoring videos being broadcasted through a variety of media or distributed over a giant network such as Internet.

However, one problem of the conventional digital video management system was that it could not perform simple storage, searching and retaining a video itself for several reasons such as diverse sizes and different standards of all digital videos stored, or noises.

One of techniques useful for digital video management services includes resolving an input video into still images to find out a video file. According to this technique, a video search manager can identify a key image semi-automatically, extract a collection of video files to be searched using the obtained key image, compare and analyze contents of the key image with contents of video files to be searched to find out a video file that matches the key image using an image comparison technology. However, since this technique is based on image search to find a matching video file, it still requires large amounts of data processing, which is not appropriate for efficient management of large capacity digital video data.

Another technique related to digital video management services is disclosed in an article by Z. Rasheed, Y. Sheikh, and M. Shah, entitled "On the Use of Computable Features for Film Classification", IEEE Transactions on Circuits and Systems for Video Technology, Vol. 15, No. 1, pp. 52-64, 2005, wherein computable visual cues are presented for the classification of films into genres. Specifically, for the detection of scene changes, color space is first converted into HSV (hue-saturation-value) to build histograms each having 8, 4, and 4 bins. Then, histogram intersection of consecutive frames is obtained and a change of scenes is detected based on anisotropic diffusion algorithm. The detected change of scenes is used to classify films into genres. However, even this film classification technology does not still propose a more efficient management method for large capacity digital video data.

Therefore, a need has existed for a novel digital video management method to minimize the use of resources such as time, storage space, etc. required for the management of large capacity digital videos.

DISCLOSURE OF INVENTION

Technical Problem

It is, therefore, a primary object of the present invention to provide a system and method for managing digital videos, which are able to recognize a specific video, search for matching digital videos, and monitor and trace digital videos that are illegally broadcasted and illegally distributed, by detecting features from digital videos.

It is another object of the present invention to provide a system and method which can efficiently manage large capacity digital videos by detecting features from digital videos.

Technical Solution

In accordance with an aspect of the present invention, there is provided a method for managing digital videos, including:

extracting a feature of an input digital video;

searching for candidate features having similarity to the extracted feature; and comparing the extracted feature with each of the candidate features to select at least one of the candidate features similar to the extracted feature and provide information on a digital video corresponding to the selected candidate feature.

In accordance with another aspect of the present invention, there is provided a system for managing digital videos, including:

a feature extracting unit for extracting a feature of an input digital video;

a feature searching unit having features of a plurality of digital videos for selecting candidate features having similarity to the extracted feature; and a feature comparing unit for comparing the extracted feature with each of the candidate features to select at least one of the candidate features similar to the extracted feature and provide information on a digital video corresponding to the selected candidate feature.

BEST MODE FOR CARRYING OUT THE INVENTION

Hereinafter, embodiments of the present invention will be described in detail with reference to the accompanying drawings.

Figure 1:
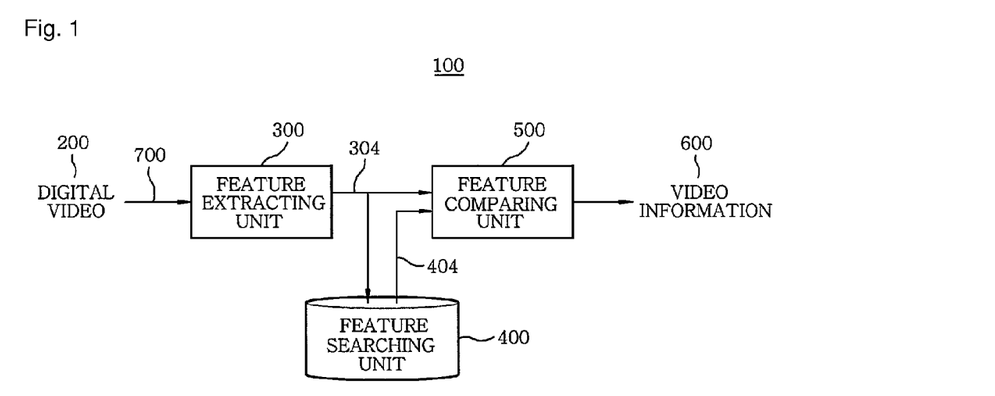
FIG. 1 illustrates a block diagram of a digital video managing system in accordance with an embodiment of the present invention.

FIG. 1 illustrates a block diagram of a digital video managing system 100 in accordance with an embodiment of the present invention. The digital video managing system 100 includes a feature extracting unit 300, a feature searching unit 400, and a feature comparing unit 500.

First, as shown in FIG. 1, an input digital video 200, which may have diverse formats and sizes, is applied to the digital video managing system 100. The diverse formats represent various compression methods used for encoding video files, and the diverse sizes represent not only width and height of a digital video but also frame rates, bit rates and so on. In FIG. 1, a channel 700 between the components may include various connection interfaces. All or some of the components in the digital video managing system 100 may exist either in a local system or in separate systems, respectively. In addition, each of the components may be connected through a local interface or a network to exchange inputs and outputs therebetween.

The feature extracting unit 300 extracts features 304 from the input digital video 200, the features 304 being the video's own attribute information, which will be further described with reference to FIG. 2. The features 304 extracted by the feature extracting unit 300 are then delivered to each of the feature searching unit 400 and the feature comparing unit 500.

The feature searching unit 400 stores a plurality of features for digital videos and search for one or more candidate features 404 having similarity with the features 304 among the features of the digital videos. Those searched candidate features 404 are then provided to the feature comparing unit 500.

The feature comparing unit 500 compares the features 304 extracted by the feature extracting unit 300 with the candidate features 404 to finally provide video information 600 indicative of a most similar digital video or digital videos having similarity with the features of the input digital video based on the comparison.

Figure 2:
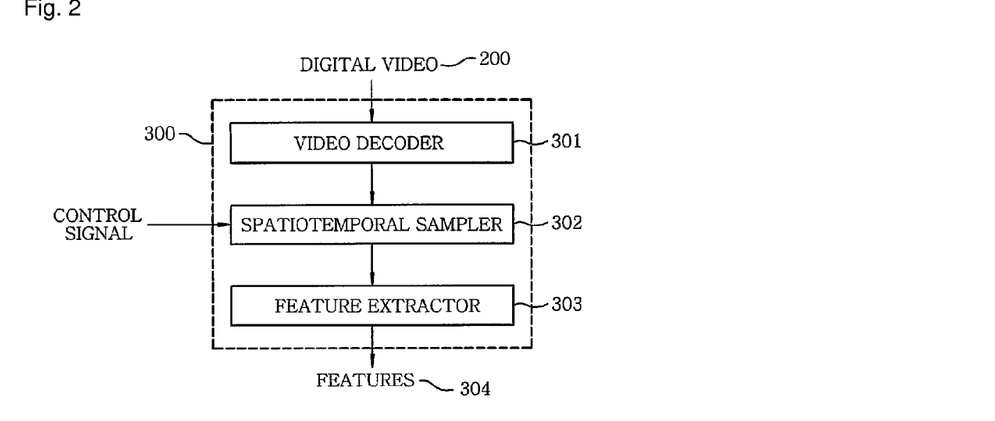
FIG. 2 shows a detailed block diagram of the feature extracting unit shown in FIG. 1.

FIG. 2 shows a detailed block diagram of the feature extracting unit 300 shown in FIG. 1.

Referring to FIG. 2, the feature extracting unit 300 includes a video decoder 301, a spatiotemporal sampler 302, and a feature extractor 303.

First, the video decoder 301 decodes the input digital video 200, which might be compressed by a variety of codecs, to obtain original RGB video frames before the compression. However, the digital videos 200 may be diverse in size, and therefore, the spatiotemporal sampler 302 normalizes the digital video frames by sampling the decoded digital video frames depending on an external control signal, including their width, height, frame rate, etc. In this manner, the digital video 200 provided to the feature extracting unit 300 is applied to the feature extractor 303 in the form of consecutive decoded frames with normalized size. The feature extractor 303 extracts attribute information from each of the input digital video frames with normalized size to create the features 304 of the input video.

Figure 3:
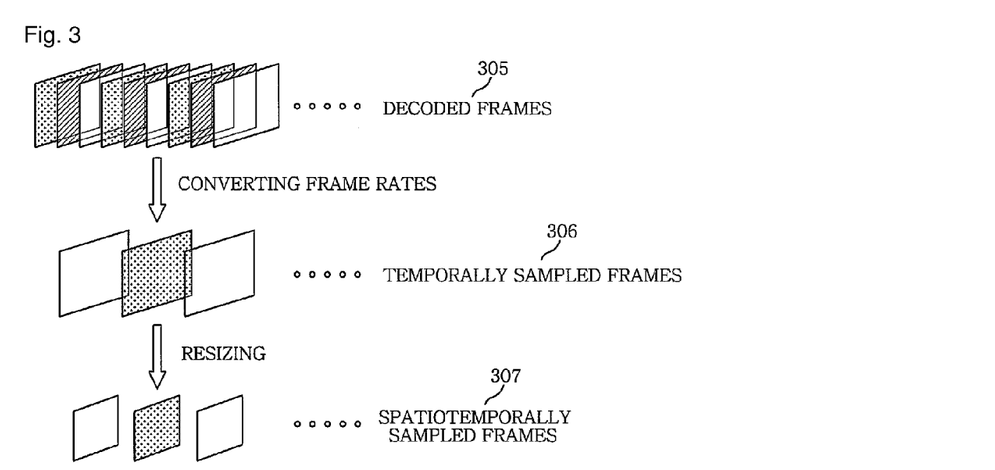
FIG. 3 is an exemplary view describing the operation of the spatiotemporal sampler shown in FIG. 2.

FIG. 3 conceptually illustrates a spatiotemporal sampling operation performed on the input digital video decoded by the spatiotemporal sampler 302 shown in FIG. 2.

As discussed earlier, the video decoder 301 provides the decoded frames 305. However, since these frames are different from one another in size and frame rate, they have to be normalized to meet the same standard in order to avoid any inconvenience in storing digital video by sizes and frame rates, separately. To do so, the spatiotemporal sampler 302 may be composed of a frame rate converter and a frame resizer. Therefore, the spatiotemporal sampler 302 converts frame rates of the decoded frames 305, and makes constantly the number of frames per second. Through this temporal sampling, temporally sampled frames 306 are created, and the number of frames to be processed is reduced, so that the processing speed of the feature extracting unit 300 or the entire system can be enhanced. Furthermore, it is possible to obtain proper robustness of continuous scene change such as fade in-out, dissolving, zoom in-out and the like by the frame rate converter.

Next, in order to make the temporally sampled frames 306 uniform in size, the spatiotemporal sampling is carried out in the spatiotemporal sampler 302 to resize the temporally sampled frames 306. By this spatiotemporal sampling, spatiotemporally sampled frames 307 are generated and provided to the feature extractor 303. This spatiotemporal sampling reduces the number of pixels of the frames to be processed, thereby improving the processing speed of the feature extracting unit 300 or the entire system.

Figure 4:
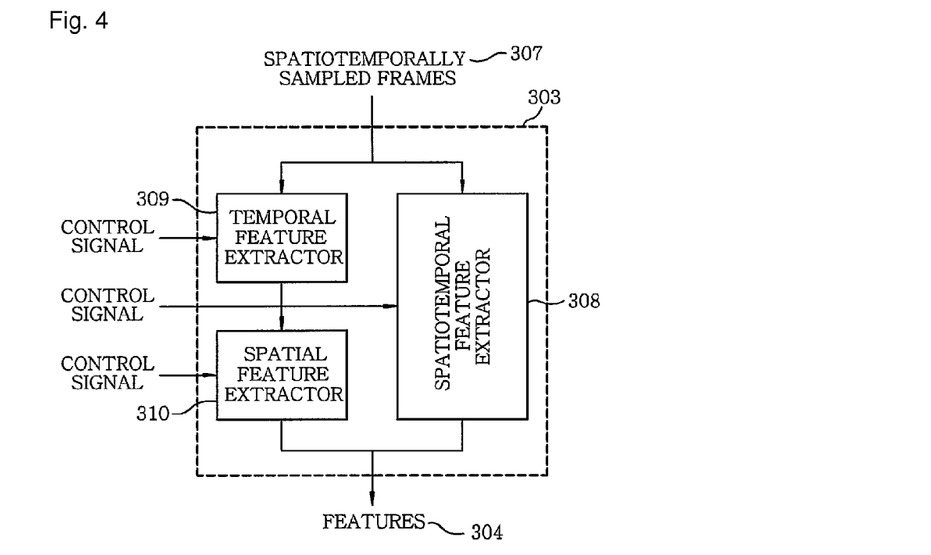
FIG. 4 presents a detailed block diagram of the feature extractor shown in FIG. 2.

FIG. 4 illustrates a detailed block diagram of the feature extractor 303 shown in FIG. 2. As discussed above, the feature extractor 303 generates the features 304 for the spatiotemporally sampled frames 307 that are provided from the spatiotemporal sampler 302. The feature extractor 303, as shown in the drawing, is provided with three kinds of extractors: a temporal feature extractor 309, a spatial feature extractor 310, and a spatiotemporal feature extractor 308. Since the digital video, by its nature, has temporal attributes in addition to spatial attributes, the feature extractor 303 must extract not only spatial features but also temporal features of the digital video to guarantee stable performance of the digital video managing system 100.

Figure 5:
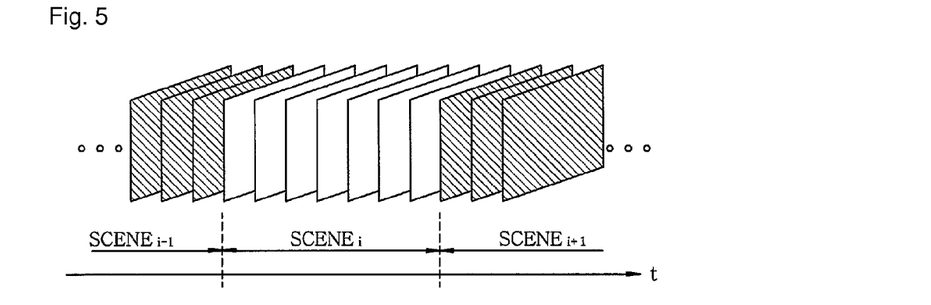
FIG. 5 depicts an exemplary view describing the relation of time and scenes in spatiotemporally sampled frames.

FIG. 5 shows that the spatiotemporally sampled frames 307 can be classified into scenes, which are meaningful consecutive frames. As aforementioned, the frames of the digital video are displayed in sequence along a time axis as shown in FIG. 5.

Specifically, the temporal features are crucial information to classify digital videos, and such features are also used to compress digital videos. To classify scenes that are the collections of meaningful frames, scene changes should be detected. In this regard, a variety of scene change detection techniques have been proposed and developed in recent years.

Among these techniques, ones with better performances can be adopted to the temporal feature extractor 309 of the present invention to detect the change of scenes.

The temporal feature extractor 309 receives the spatiotemporally sampled frames 307, and outputs scene intervals of the digital video, and a representative frame of scenes of the digital video. As illustrated in FIG. 5, the scene interval is expressed by a frame distance or time interval between frames with scene changed, which are detected by using any of techniques capable of detecting the changes of scenes well-known in the art.

The spatiotemporal sampler 302 shown in FIG. 2 has already carried out temporal sampling, and therefore, time interval between frames of the input digital video 200 is all constant. A representative frame representing a scene is extracted beyond a certain period of time after the change of scene is detected, the reason of which will be explained below. In general, the scene changes can be categorized into abrupt scene changes and consecutive scene changes. In the latter case, if a frame with scene changed is selected as a representative frame, the representative nature for the scene may be lost because of fade or overlap effect. For this reason, the representative frame is chosen after lapse of a certain number of frames. Needless to say, the length of delay for selecting the representative frame should be shorter than the minimal scene interval. To this end, the temporal feature extractor 309 receives a control signal that indicates whether to use the temporal feature extractor 309, delay length or time interval for selecting the representative frame, choice of a scene change detection method, etc.

Meanwhile, the spatial feature extractor 310 extracts spatial attributes of the digital video 200 from the scene interval of the digital video and the representative frame of the scene, which are provided by the temporal feature extractor 309. Alternatively, spatial attributes of the digital video 200 may be generated directly from the spatiotemporally sampled frames 307. Since the former provides the representative frame selected from each scene by using the temporal feature extractor 307, it reduces complexity in the spatial feature extractor 310 and removes redundancy of information, thereby enabling the efficient extraction of features.

However, a representative frame is selected from a scene to extract a spatial feature of the scene, and thus, the selection of a wrong representative frame degrades the reliability of the spatial feature of the scene. Therefore, with the adaptation of the system as in the latter case, spatial features may be extracted directly from the spatiotemporally sampled frames 307, without using the temporal feature extractor 309. In this case, because spatial features are extracted from the spatiotemporally sampled frames 307, a much greater amount of information is extracted compared with the former case, resulting in an increase in complexity but improvement in accuracy.

Figure 6:
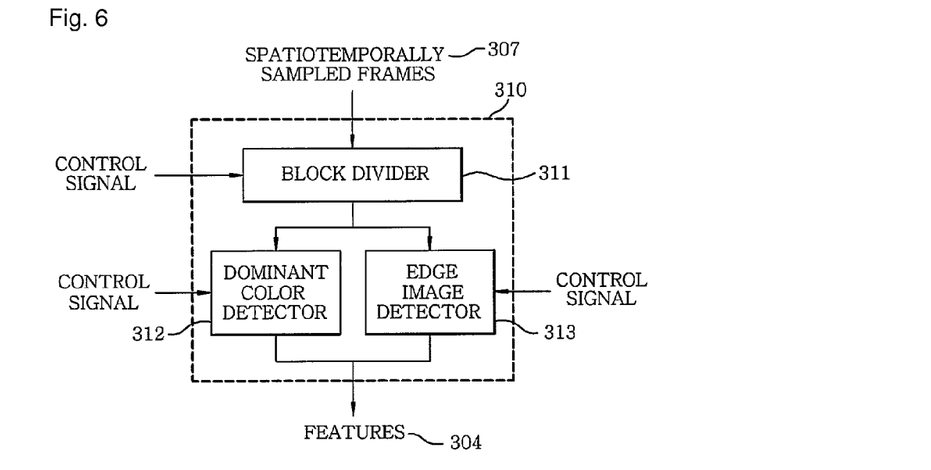
FIG. 6 illustrates a detailed block diagram of the spatial feature extractor shown in FIG. 4.

FIG. 6 depicts a detailed block diagram of the spatial feature extractor 310 shown in FIG. 4.

In case the spatial feature extractor 310 makes use of the output from the temporal feature extractor 309 to extract features of the digital video 200, the inputs to the spatial feature extractor 310 are the scene intervals of the digital video 200 and the representative frames of scenes. In the spatial feature extractor 310, thus, the scene interval is directly outputted as the feature 304 of the digital video 200, and only the representative frame of scene are inputted to the spatial feature extractor 310. On the other hand, in case the spatial feature extractor 310 does not utilize the output from the temporal feature extractor 309, the inputs to the spatial feature extractor 310 are the spatiotemporally sampled frames 307 of the digital video 200.

The spatial feature extractor 310 receives the frames processed as described above, regardless of whether or not to use the temporal feature extractor 309. As shown in FIG. 6, the spatial feature extractor 310 is comprised of a block divider 311, a dominant color detector 312, and an edge image detector 313. As shown in the drawing, a control signal applied to the spatial feature extractor 310 contains three control signals for the components 310, 311, and 312.

The block divider 311 divides each of the frames into image blocks, respectively, in response to the control signal applied thereto. The control signal applied to the block divider 311 contains information on the number of image blocks, a starting position of each image block, width and height of each image block, etc., the size of each image block being smaller than that of each frame. The divided image blocks by the block divider 311 are then provided to each of the dominant color detector 312 and the edge image detector 313.

The dominant color detector 312 detects color composition of each of the image blocks from the block divider 311 by using an optimal one of dominant color search methods well-known in the art. The control signal to the dominant color detector 312 contains information on whether or not to use the dominant color detector 312, the number of dominant colors to be detected, choice of a dominant color detection method, etc.

The edge image detector 313 detects information on the shape of objects in each of the image blocks by employing an optimal one of edge detection algorithms well-known in the art. Although the edge image detector 313 may use a detected edge image as it is, it may do additional works, such as projecting the detected image in horizontal and vertical directions, obtaining a histogram based on the pattern of edges, and employing a numerical value using strength and direction of edges, thereby enabling to facilitate processing in the digital video searcher 500 and the digital video comparator 600. The control signal to the edge image detector 313 contains information on whether or not to use the edge image detector 313, an edge image detection method, and so on.

Figure 7:
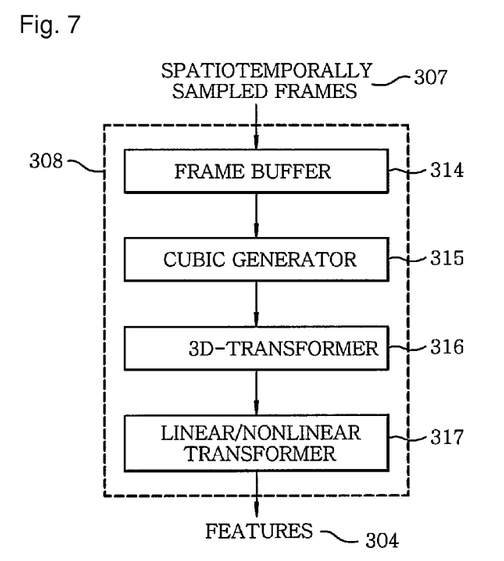
FIG. 7 provides a detailed block diagram of the spatiotemporal feature extractor shown in FIG. 4.

FIG. 7 illustrates a detailed block diagram of the spatiotemporal feature extractor 308 shown in FIG. 4. The spatiotemporal feature extractor 308 includes a frame buffer 314, a cubic generator 315, a 3D transformer 316, and a linear/nonlinear transformer 317. The spatiotemporal feature extractor 308 performs 3D transformation on three elements corresponding to width, height, and either time or frame number, as will be described in detail with reference to FIGS. 8 and 9. Hence, it does not need to process temporal information additionally.

Figure 8:
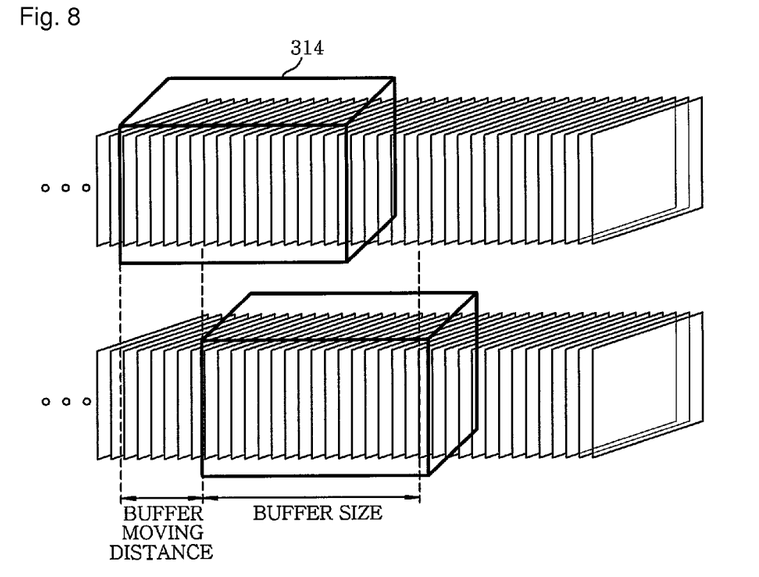
FIG. 8 describes the operation of the frame buffer shown in FIG. 7.

FIG. 8 shows one example of the frame buffer 314. When the spatiotemporally sampled frames 307 are inputted, the frame buffer 314 temporarily stores as many frames as the buffer size, in response to a control signal containing a buffer size and a buffer moving distance; provides the frames to the cubic generator 315; and moves the frames by the buffer moving distance. The buffer moving distance in the control signal cannot exceed the buffer size. In general, the shorter the buffer moving distance, the slower the processing speed of the spatiotemporal feature extractor 308. However, this leads to a decrease in the required storage space, thereby improving the performance of the digital video managing system 100. On the contrary, the longer the buffer moving distance, the faster the spatiotemporal feature extractor 308. However, this leads to an increase in the required storage space, thereby degrading the performance of the digital video managing system 100. It is preferred that the buffer moving distance is about half of the buffer size, and is variable depending on the application field of the digital video managing system 100.

Figure 9:
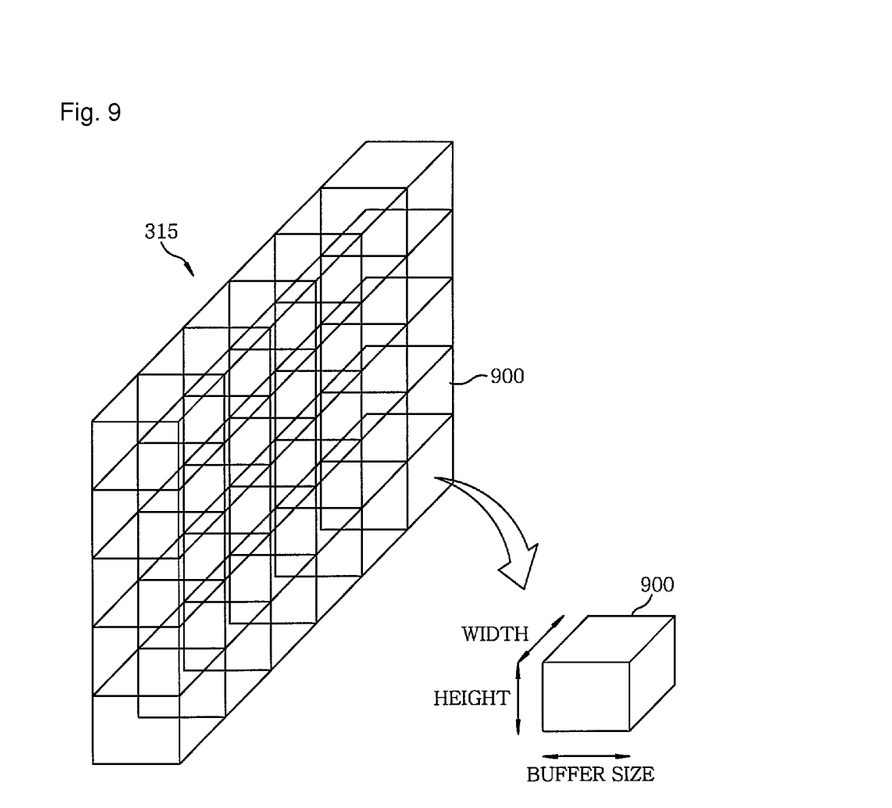
FIG. 9 is a diagram illustrating a cubic divided by the cubic generator in FIG. 7.

FIG. 9 shows one example of the cubic generator 315. The cubic generator 315 divides each of the spatiotemporally sampled frames 307 as many as the buffer size provided from the frame buffer 314 into plural cubics 900, in response to a control signal containing information on the number of cubics in the horizontal and vertical directions. The cubic generator 315 functions similar to the block divider 311 discussed earlier, but it performs a 3D-based processing. Width of each cubic 900 shown in FIG. 9 is determined by dividing the width of the frame by the number of cubics in the horizontal direction, and height of each cubic is determined by dividing the height of the frame by the number of cubics in the vertical direction. And, length of each cubic 900 is equal to the buffer size of the frame buffer 314.

The cubics 900 generated by the cubic generator 315 are then supplied to the 3D transformer 316. Since transforming spatial domain to frequency domain has superior energy cohesion capability compared with other transformation methods, 2D DCT (discrete cosine transform) has widely been used in many video compression methods. The control signal applied to the 3D transformer 316 contains information on a width, a height, and a depth of each cubic in 3D space of spatial and frequency domain. Moreover, the 3D transformer 316 has many kinds of 3D transforming schemes (e.g., wavelet, DCT, fourier, laplace, haar, etc.) to be used, and takes a selection signal for transformation methods as its control signal according to applications of the digital video managing system 100. Based on this fact, the present invention employs 3D DCT that is also adapted to XYZ codec that is one of video compression methods. By processing each cubic using the 3D transformer 316, each cubic is transformed into frequency components, which are referred to as a transformed cubic, X. The transformed cubic X is provided to the linear/nonlinear transformer 317.

The linear/nonlinear transformer 317 processes the transformed cubic X provided from the cubic generator 315 and the 3D transformer 316. The linear/nonlinear transformer 317 has various kinds of linear/nonlinear transformation methods to be utilized, and takes a selection signal for transformation methods as its control signal. For instance, if the control signal indicates one dimensional linear transformation, the transformed cubic X will yield a result for aX+b as a video feature, where a and b are constant values according to the characteristics of digital video managing system 100. The linear/nonlinear transformer 317 may select and use any of the linear/nonlinear transformation methods installed therein, depending on applications of the digital video managing system 100.

The features 304 extracted by the feature extracting unit 300 are as follows. If both the temporal feature extractor 309 and the spatial feature extractor 310 are used, the features obtained thereby correspond to scene intervals of the input digital video 200, and dominant color information and edge information of an image block in a representative frame. Meanwhile, video features obtained through the spatiotemporal feature extractor 308 correspond to linearly or nonlinearly transformed cubics.

Referring back to FIG. 1, the feature searching unit 400 searches for candidate features having similar features to the features 304 extracted by the feature extracting unit 300. The feature searching unit 400 may employ various kinds of DBMSs (database management systems) commercially available, and adopt diverse search algorithms to design and apply an appropriate feature searcher. Moreover, it can use a specialized system such as a main memory DBMS in order to improve searching capability. Due to an improved speed and a decreased price of memories and diverse peripherals, the feature searching unit 400 may also be installed directly at a high-performance hard disk, SSD (solid state disk), RAM disk or main memory.

Figure 10:
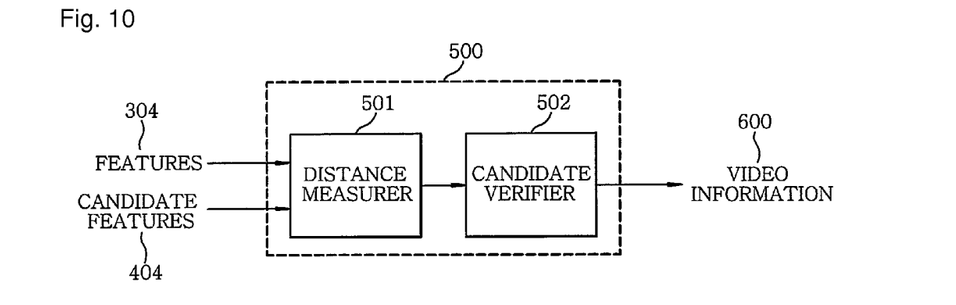
FIG. 10 offers a detailed block diagram of the feature comparing unit shown in FIG. 1.

FIG. 10 illustrates a detailed block diagram of the feature comparing unit 500 shown in FIG. 1.

The feature comparing unit 500 receives the features 304 extracted by the feature extracting unit 300 and the candidate features 404 searched by the feature searching unit 400. As shown in the drawing, the feature comparing unit 500 includes a distance measurer 501 and a candidate verifier 502. The distance measurer 501 measures a distance between the features 304 and the candidate features 404. The distance measurement is basically done by using a sum of squared distances or a sum of absolute distances among Euclidean distances, or by using more suitable distance measurement such as Hausdorff, Hamming, Mahalanobis, Minkowski, Chebychev, Battachaya, and so on, depending on the features to be used.

The candidate verifier 502 receives the distances measured by the distance measurer 501 and yields video information 600 indicative of recognizing as a matching video or videos. In this regard, the candidate verifier 502 repeats an experiment several times taking account of the requirements and the required performance of the digital video managing system, to thereby determine an appropriate maximum permissible distance. That is, the candidate verifier 502 sets a suitable range of the distance depending on whether it provides a matching video or a plurality of videos with a similar feature as the search result. For instance, in case of searching for digital videos with a similar feature to the input digital video among a plurality of digital video features stored in the database, the feature searching unit 400 sets the distance to a proper value such that videos having information on the similar feature can be searched out, and outputs digital videos having the distance that falls within a predetermined reference range as a group of candidate digital videos having similarity to the input digital video.

As described above, the present invention can manage digital videos not using digital video's own values but using various features representing the videos. Based on the fact that a digital video has spatial attributes such as digital images as well as temporal attribute information, it is possible to easily recognize, search for, monitor and trace large capacity digital videos more efficiently. Further, the use of resources such as time and storage space for the management of large capacity digital videos can be minimized.

While the invention has been shown and described with respect to the preferred embodiments, it will be understood by those skilled in the art that various changes and modification may be made without departing from the scope of the invention as defined in the following claims.

The invention claimed is:

1. A machine-implemented method for managing digital videos, comprising:
    extracting a feature of an input digital video;
    searching a plurality of candidate features of a plurality of digital ideos for candidate features having similarity to the extracted feature;
    comparing the extracted feature with each of the candidate features to recognize a matching digital video of the plurality of digital videos having at least one of the candidate features similar to the extracted feature and provide information on the matching digital video corresponding to the at least one similar candidate feature; and wherein extracting the feature of an input digital video includes:
  decoding the input digital video to generate digital video frames;
  normalizing the digital video frames to a predetermined uniform size; and
  extracting temporal and spatial attributes from the video frames with the normalized size, the temporal and spatial attributes being used as the extracted feature, wherein extracting temporal and spatial attributes includes:
    storing the normalized frames in a frame buffer by a predetermined frame buffer size;
    dividing the stored normalized frames into 3D-based cubics with predetermined width, height and length;
    performing 3D transformation on the divided cubics; and
    performing linear transformation or non-linear transformation on the transformed cubics to extract the temporal and spatial attributes of the input digital video, wherein the predetermined width is determined by dividing a width of the stored normalized frames by a number of cubics in a horizontal direction, the predetermined height is determined by dividing a height of the stored normalized frames by a number of cubics in a vertical direction, and the predetermined length is equal to the predetermined frame buffer size.

2. The machine-implemented method of claim 1, wherein normalizing the digital video frames includes resizing width, height, and frame rate of each of the video frames into predetermined reference values.

3. The method of claim 1, wherein extracting temporal and spatial attributes includes:
  extracting scene interval and a representative frame of each scene from the normalized frames; and
  extracting delay length between representative frames or time interval and scene change based on the extracted scene interval and the representative frame of each scene.

4. The machine-implemented method of claim 1, wherein the step of extracting temporal attribute includes the steps of:
  dividing each of the normalized frames into image blocks with a predetermined size;
  detecting a dominant color from each of the divided image blocks; and
  detecting an edge from an edge image of each of the divided image blocks.

5. The machine-implemented method of claim 4, wherein the edge is obtained by projecting the edge image in horizontal and vertical directions, or generating a histogram based on the pattern of the edge image.

6. The machine-implemented method of claim 4, wherein the edge is obtained by calculating a sum of weights relative to strength and direction of the edge image.

7. The machine-implemented method of claim 1, wherein the normalized frames stored in the frame buffer are moved from a starting position to a predetermined buffer and newly normalized frames are stored in the frame buffer by the predetermined frame buffer size after processing the stored normalized frames.

8. The machine-implemented method of claim 1, wherein comparing the extracted feature with each of the candidate features comprises:
  measuring a distance between the extracted feature of the input digital video and each of the candidate features.

9. A system for managing digital videos, comprising:
  a feature extracting unit for extracting a feature of an input digital video;
  a feature searching unit having a plurality of features of a plurality of digital videos for searching for candidate features having similarity to the extracted feature;
  a feature comparing unit for comparing the extracted feature with each of the candidate features to recognize a matching digital video of the plurality of digital videos having at least one of the candidate features similar to the extracted feature and provide information on the matching digital video corresponding to the at least one similar candidate feature; and
  wherein the feature extracting unit includes:
    a video decoder for decoding the input digital video into RGB video frames;
    a spatiotemporal sampler for normalizing the decoded video frames to a uniform size; and
    a feature extractor for extracting, as the feature of the input digital video, temporal and spatial attributes of the normalized video frames, wherein the feature extractor includes:
      a temporal feature extractor for extracting a temporal feature from the normalized frames;
      a spatial feature extractor for extracting a temporal feature from the normalized frames; and
      a spatiotemporal feature extractor for extracting a spatiotemporal feature from the normalized frames, wherein the spatiotemporal feature extractor includes:
        a frame buffer for temporarily storing the normalized frames by a predetermined buffer size;
        a cubic generator for dividing the normalized frames into 3D-based cubics with predetermined width, height and length;
        a 3D transformer for per 3D transformation on the divided Cubics; and
        a linear/nonlinear transformer for performing linear transformation or nonlinear transformation on the 3D transformed cubics, wherein the predetermined width is determined by dividing a width of the stored normalized frames by a number of cubics in a horizontal direction, the predetermined height is determined b dividing a height of the stored normalized frames by a number of cubics in a vertical direction, and the predetermined length is equal to the predetermined frame buffer size.

10. The system of claim 9, wherein the temporal feature extractor extracts scene interval and a representative frame of each scene from the normalized frames.

11. The system of claim 9, wherein the spatial feature extractor includes:
  a block divider for dividing each of the normalized frames into image blocks with a predetermined size;
  a dominant color detector for detecting a dominant color from each of the divided image blocks; and
  an edge image detector for detecting an edge of each of the divided image blocks from an edge image of each of the divided image blocks.

12. The system of claim 11, wherein the edge image detector obtains the edge by projecting the edge image of each image block in horizontal and vertical directions.

13. The system of claim 11, wherein the edge image detector obtains the edge image by generating a histogram based on the pattern of the edge image of each block, or calculating a sum of weights relative to strength and direction of the edge image.

14. The system of claim 9, wherein the feature comparing unit includes:
- a distance measurer for measuring a distance between the feature of the input digital video and each of the candidate features; and
- a candidate verifier for selecting at least one of the candidate features having the distance that falls within a reference range to provide information on a digital video corresponding to the selected candidate feature.

15. The machine-implemented method of claim 8, wherein the distance is a Euclidean distance.

* * * * *